Aug. 7, 1962     D. H. CISSNA ET AL     3,048,284
STABILIZER FOR LOAD HANDLING EQUIPMENT
Filed Aug. 28, 1958     2 Sheets-Sheet 1
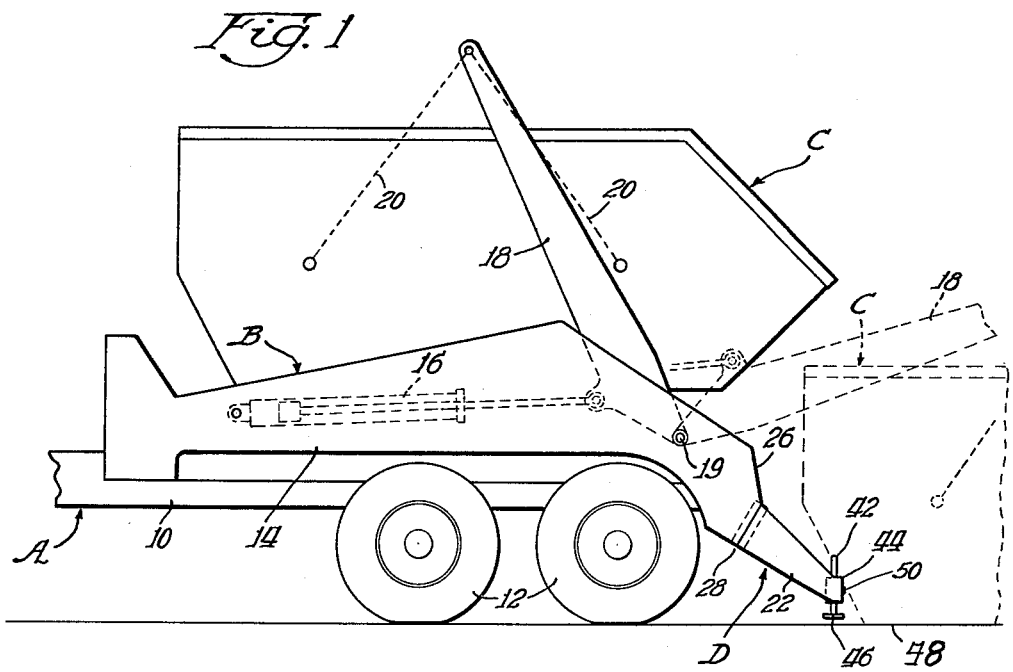
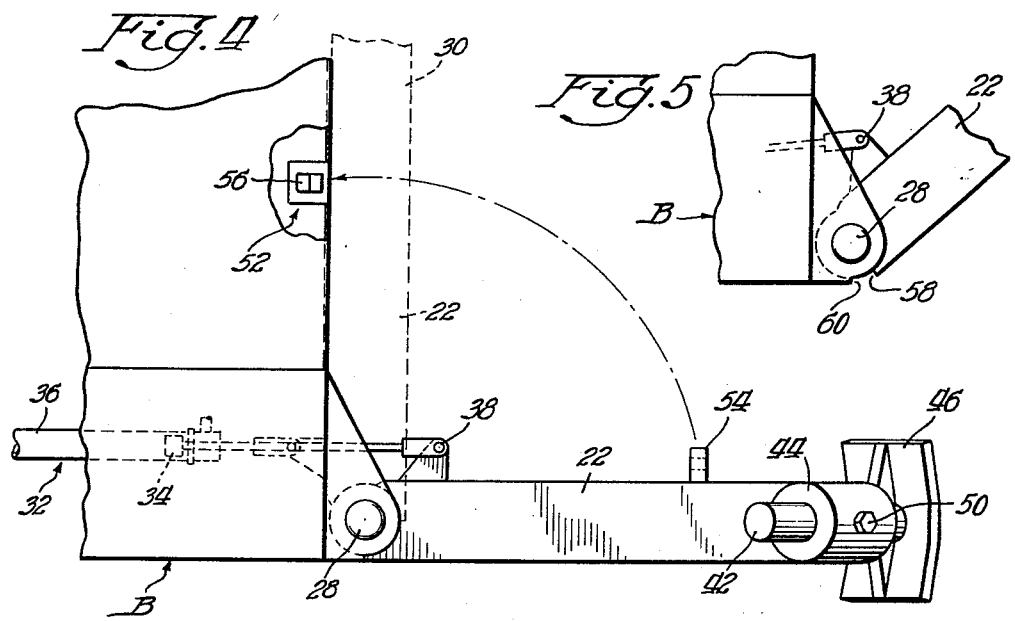
Inventors:
David H. Cissna and
Clayton K. Cole
By: Frank R. Thienpont
Atty.

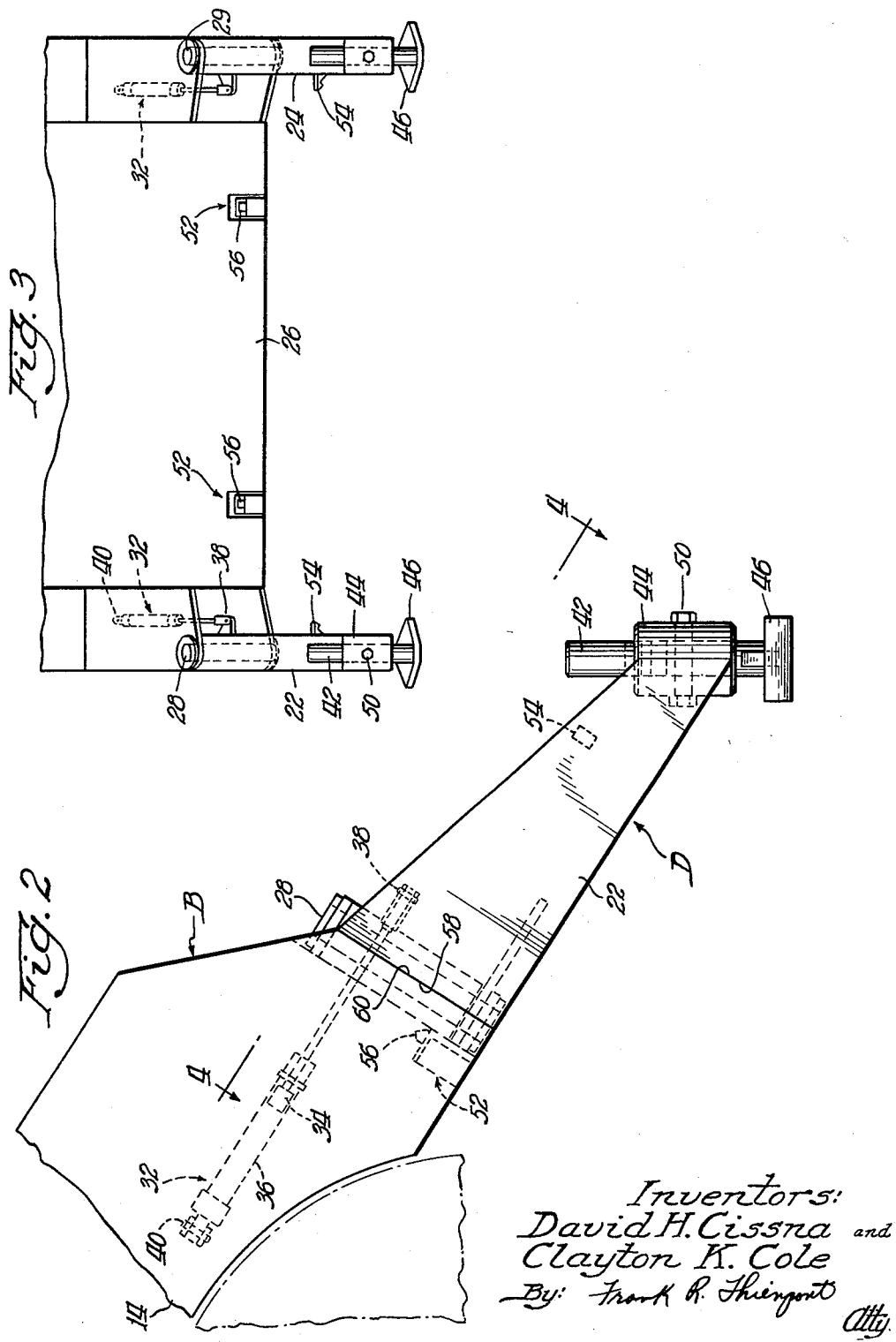

United States Patent Office 3,048,284
Patented Aug. 7, 1962

3,048,284
STABILIZER FOR LOAD HANDLING EQUIPMENT
David H. Cissna and Clayton K. Cole, Kalamazoo, Mich., assignors, by mesne assignments, to The Heil Co., Milwaukee, Wis.
Filed Aug. 28, 1958, Ser. No. 757,784
2 Claims. (Cl. 214—77)

The present invention relates to swingable stabilizer support arms for loading, hauling and dumping equipment and more particularly to a stabilizer arm for balancing work loads under all conditions of terrain.

Heretofore, it has been found that jack-like supports of the known types have in some instances been unstable and unreliable. When the equipment, such as a truck for example, is situated on unlevel ground or rough terrain slight forward or backward movement of the truck sometimes tends to tip the truck off the jack-like support. This may also occur when the equipment is resting on an incline.

An object of this invention, therefore, is to provide improved support arms at the rear of the vehicle so mounted that they will not give or buckle if unlevel ground, rough terrain or the like tends to cause forward or backward movement of the vehicle.

Another object of this invention is to provide improved swingable support arms on a vehicle, such as a truck, to relieve the vehicle chassis from extreme overhung load when a bucket or load is being raised from or lowered to the ground.

Another object of this invention is to provide a support arm which may easily and positively be lowered into place and retracted by means of a hydraulically operated mechanism.

Still another object of this invention is to provide on each side of a vehicle support arms having a sturdy hinge-stop arrangement which will resist sidewise movement of the vehicle due to unbalanced loads tending to move the vehicle in a sidewise direction.

Still another object is to provide support arms having an adjustable foot section so that a support arm may be lowered to an extended position without immediate contact with the supporting surface.

Other objects and advantages of the invention will become apparent from the following description when taken in conjunction with the accompanying claims and drawings in which:

FIG. 1 is a side elevation of a portion of a truck chassis with a support arm at the rear of the truck in readiness for supporting a load when the load is swung over the end of the truck.

FIG. 2 is an enlarged view of the support arm in an extended position and showing in dotted lines the hydraulic mechanism attached thereto for extending and retracting the support arm.

FIG. 3 is a rear elevational view showing the support arms at each side of the vehicle.

FIG. 4 is a plan view along the line 4—4 of FIG. 2 showing the support arm in an extended position.

FIG. 5 is a plan view of a portion of a support arm in a partially retracted position showing a hinge-stop arrangement.

Referring to the drawings wherein like reference characters designate corresponding parts throughout the several views, A is a portion of a load carrying unit such as a truck, for example, B is a handling unit for a bucket or load, C is a bucket or load, and D is a support unit made in accordance with the present invention.

The truck A comprises a chassis 10 at the rear of the truck A and supported by the rear wheels 12 and suitable rear springs (not shown). The handling unit B mounted on the truck chassis 10 includes a sub-frame 14 within which is mounted a hydraulic unit 16 comprising a piston and cylinder arrangement operable by suitable controls (not shown). The hydraulic unit 16 operates a boom mechanism 18 having two arms (only one of which is shown) and respectively pivotally mounted on each side of the truck on axes 19 in the sub-frame 14 for swinging movement over the rear end of the truck. The boom mechanism 18 is connected with the bucket C by means of chains 20.

The support unit D comprises a pair of support arms 22 and 24 each respectively pivotally mounted on the rear end 26 of the sub-frame 14 on pivotal axes 28 and 29. The support arm 22 is shown in an extended support position and may be swung counter-clockwise on the axis 28 from the position shown in solid lines to a retracted position 30 as shown by the dotted lines in FIG. 4. A suitable hydraulic mechanism 32 comprising a piston 34 connected to the support arm 22 by the pivotal connection 38 and a cylinder 36 connected to the sub-frame 14 by the pivotal connection 40, shown in FIGS. 2 and 3, is utilized to extend and retract the support arm 22. The hydraulic mechanism 32 may be operated by suitable controls (not shown) preferably convenient to the operator of the vehicle.

The pivotal axes 28 and 29 of the support arms 22 and 24 for folding the arms into a retracted position, are inclined so as to form an acute angle with the bottom side of the chassis 10 and the sub-frame 14. A vertical plane in which the pivotal axis 28 of the support arm 22 lies is substantially parallel to the longitudinal center line of the chassis 10. The purpose of this arrangement is hereinafter explained. The same is true of pivotal axis 29 of support arm 24.

The support arm 24 mounted on the right side of the vehicle is of the same type and construction and operates in the same manner as support arm 22 except that the support arm 24 is swung by a hydraulic mechanism 32, in a clockwise direction as viewed in plan, to move from an extended to a retracted position.

The effective length of the arm 22 may be varied to balance a load on uneven terrain. To this end, the support arm 22 has a positionable shaft or support bar 42 slidable in a lower end portion 44 of the arm 22. Attached to the shaft 42 at the lower end thereof is a foot portion 46 for contact with a supporting surface 48 such as the ground, for example. The shaft 42 is positionable or adjustable in the end of the support arm 22 by means of a pin 50 which extends through suitable openings in the lower end portion 44 of the support arm 22 and the shaft 42. It will be noted that the lower end portion 44 is disposed at an angle to the support arm 22 so that the shaft 42 assumes a position substantially perpendicular to the supporting surface 48 when the arm 22 is in the position illustrated in FIG. 1.

A latch mechanism 52 having co-acting portions 54 and 56 mounted respectively on the support arm 22 and the sub-frame 14 retains the support arm 22 in a retracted position when not in use.

The support arms 22 and 24 also provide lateral stability for the truck 10 by means of a sturdy hinge-stop arrangement provided by the edges 58 and 60 of the support arm 22 and the sub-frame 14 respectively. The edges 58 and 60 come together when the support arm is in an extended position substantially parallel to the longitudinal center line of the vehicle thus preventing further outward movement of the support arm 22. The support arm 24 has the same type of hinge-stop arrangement. Thus sidewise movement to the right is restrained by the left support arm 22 and sidewise movement to the left is restrained by the right support arm 24.

In operation, when a load is about to be lowered from the truck A or raised from the ground to rest on the chassis 10 the support arms 22 and 24 on each side of the vehicle are first extended to a supporting position by hydraulic mechanisms 32. When thus extended there will be considerable space between the foot portion 46 and the supporting surface 48. Such a predetermined condition allows each of the support arms to be easily lowered to any desired position and conveniently retracted. Such a condition also permits the rear wheel springs (not shown) to be partially depressed and bear part of the load when a load is raised thus relieving the support arms from carrying the full load. When the rear wheel springs are depressed in such a manner the vehicle becomes more securely anchored to provide better traction and increased stability during manipulation of a load.

After the support arms are extended to a supporting position the load or bucket C may be swung from a resting position on the ground to its supported position on the truck as shown in FIG. 1, or vice versa, by means of the hydraulically operated boom mechanism 18. The support arms 22 and 24 act as struts or a fulcrum about which the load C is pivoted. With the extended support arms 22 and 24 acting as struts the rear end of the vehicle is stabilized preventing the front end from tipping upwardly when a load C is in an overhung position while being lowered or hoisted. This particular type of support arm as distinguished from supports of the jack type is not susceptible to being thrown out of a supporting position by a tendency of the vehicle to move in a forward or backward direction.

It will be noted that the pivotal axis 28 of the support arm 22 is so positioned that a tendency of the vehicle to move forward or backward will not cause the support arm to fold. Such a deficiency, of course, existed in supports of the jack type since those supports are commonly swingably disposed on a horizontal axis positioned transversely of the vehicle and perpendicular to the plane of the swing of the load. It is such a deficiency that this invention specifically eliminates. Each of the pivotal axes 28 and 29 lies in a longitudinal vertical plane which is substantially parallel to the longitudinal center line of the vehicle.

Another advantage of having the pivotal axes 28 and 29 inclined rather than in a horizontal position, for example, is that the support arms 22 and 24 are thereby thrown into a more rearwardly position to serve as a more effective strut or balancing means. It will be appreciated that where lighter loads are involved the axes 28 and 29 may be more nearly horizontal.

A support unit comprising support arms as described herein may be adapted to other types of load handling devices where the manipulation of an overhanging load may tend to tip the load handling device.

Thus it can be seen that this invention advantageously provides improved stable support arms which can effectively resist being moved out of a support position due to a tendency of a vehicle to slip or otherwise move in a forward, backward or sidewise direction. The hinge-stop arrangement advantageously provides a lateral stability thus preventing release of the support arm from a supporting position due to side sway of the vehicle. The inclined position of the pivotal axis (of the support arm) from the horizontal is such that the support arm may be swung to a more rearwardly position to provide a more effective counter-balancing effect.

We wish it to be understood that this invention is not to be limited to the specific constructions and arrangements shown and described except only insofar as the claims may be so limited as it will be apparent to those skilled in the art that changes may be made without departing from the principles of the invention.

We claim:

1. In a load handling vehicle wherein a load is swung over one end of the vehicle substantially in the direction of the longitudinal center line of the vehicle by a hoisting unit pivotally mounted adjacent one end portion of the vehicle, said vehicle having a chassis with an outwardly downwardly directed extension at said end, a retractable folding support for the load handling vehicle comprising, a support arm, and means hingedly connecting the inner end portion of said support arm to the outer end portion of the chassis extension whereby the arm may be swung from a retracted position to an out-stretched position forming a downwardly outwardly directed continuation of the chassis extension, the adjacent end portions of the support arm and the chassis extension having faces which abut, when the support arm is extended, in a plane tilted outwardly at an acute angle from vertical, the hinge connection for the adjacent ends of the support arm and chassis extension having its axis parallel to the plane of said abutting faces of said arm and chassis extension.

2. In a load handling vehicle wherein a load is swung over the rear end of the vehicle substantially in the direction of the longitudinal center line of the vehicle by a hoisting unit pivotally mounted adjacent the rear end portion of the vehicle, said vehicle having a chassis with a rearwardly downwardly directed extension, a retractable folding support for the load handling vehicle comprising, a support arm, means hingedly connecting the inner end portion of said support arm to the outer end portion of the chassis extension whereby the arm may be swung from a retracted position to an out-stretched position forming a downwardly rearwardly directed continuation of the chassis extension, the adjacent end portions of the support arm and the chassis extension having faces which abut, when the support arm is extended, in a plane tilted rearwardly at an acute angle from vertical, the hinge connection for the adjacent ends of the support arm and chassis extension having its axis parallel to the plane of said abutting faces of said arm and extension, and a support bar mounted on the outer end portion of said arm for contact with a vehicle supporting surface when said arm is in its out-stretched position.

References Cited in the file of this patent

UNITED STATES PATENTS

| | | |
|---|---|---|
| 845,770 | Ferris et al. | Mar. 5, 1907 |
| 2,313,514 | Brooks | Mar. 9, 1943 |
| 2,621,811 | Lull | Dec. 16, 1952 |
| 2,740,538 | Felkner | Apr. 3, 1956 |
| 2,750,204 | Ohrmann | June 12, 1956 |
| 2,812,868 | Crile | Nov. 12, 1957 |
| 2,848,123 | Keys | Aug. 19, 1958 |